US012214623B2

(12) United States Patent
Tahara et al.

(10) Patent No.: US 12,214,623 B2
(45) Date of Patent: Feb. 4, 2025

(54) TIRE

(71) Applicant: Sumitomo Rubber Industries, Ltd., Kobe (JP)

(72) Inventors: Kotaro Tahara, Kobe (JP); Yoshifumi Kawagoe, Kobe (JP); Mari Mishima, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 126 days.

(21) Appl. No.: 18/105,572

(22) Filed: Feb. 3, 2023

(65) Prior Publication Data
US 2023/0271455 A1 Aug. 31, 2023

(30) Foreign Application Priority Data

Feb. 25, 2022 (JP) .................................. 2022-027771
Feb. 25, 2022 (JP) .................................. 2022-027772

(51) Int. Cl.
*B60C 11/12* (2006.01)
*B60C 11/03* (2006.01)

(52) U.S. Cl.
CPC ...... *B60C 11/1218* (2013.01); *B60C 11/1272* (2013.01); *B60C 2011/0372* (2013.01)

(58) Field of Classification Search
CPC ............ B60C 11/1218; B60C 11/1272; B60C 2011/0372; B60C 2011/1254;
(Continued)

(56) References Cited

U.S. PATENT DOCUMENTS 6,170,546 B1 * 1/2001 Koyama ................. B60C 11/12
152/209.27
2010/0139826 A1 * 6/2010 Matsumoto ......... B60C 11/0304
152/209.18
(Continued)

FOREIGN PATENT DOCUMENTS

JP 2012-188080 A 10/2012
JP 2018-8585 A 1/2018
(Continued)

OTHER PUBLICATIONS

Extended European Search Report for European Application No. 23154467.7, dated Jun. 26, 2023.

*Primary Examiner* — Justin R Fischer
*Assistant Examiner* — Brendon Charles Darby
(74) *Attorney, Agent, or Firm* — Birch, Stewart, Kolasch & Birch, LLP

(57) ABSTRACT

A tread portion includes a crown land portion including first and second longitudinal edges extending in the tire circumferential direction. The crown land portion is provided with first, second and third crown sipes. The first, second and third crown sipes open at the ground contact surface via respective chamfer portions. The first and third crown sipes extend from the first longitudinal edge and have closed ends in the ground contact surface. The second crown sipes extend from the second longitudinal edge and have closed ends in the ground contact surface. Each first crown sipe has a constant opening width in a longitudinal direction of the sipe. Each second crown sipe has a constant opening width in a longitudinal direction of the sipe. Each third crown sipe has an opening width which decreases continuously from the first longitudinal edge toward the closed end thereof.

20 Claims, 16 Drawing Sheets

(58) Field of Classification Search
CPC ............ B60C 11/1281; B60C 11/1204; B60C 11/1236; B60C 11/125; B60C 11/1392; B60C 11/1384
See application file for complete search history.

(56) References Cited

U.S. PATENT DOCUMENTS

| | | |
|---|---|---|
| 2017/0050470 A1 | 2/2017 | Kanematsu |
| 2018/0015789 A1 | 1/2018 | Horiguchi et al. |
| 2018/0126790 A1* | 5/2018 | Muhlhoff ............ B60C 11/0306 |
| 2018/0281526 A1* | 10/2018 | Muhlhoff ............ B60C 11/1204 |
| 2019/0160880 A1* | 5/2019 | Wakasugi ........... B60C 11/1204 |
| 2020/0338930 A1* | 10/2020 | Buresh ................ B60C 11/1236 |

FOREIGN PATENT DOCUMENTS

| | | |
|---|---|---|
| JP | 2019-73131 A | 5/2019 |
| JP | 2019-94009 A | 6/2019 |

* cited by examiner

FIG.15  Comparative Example 1
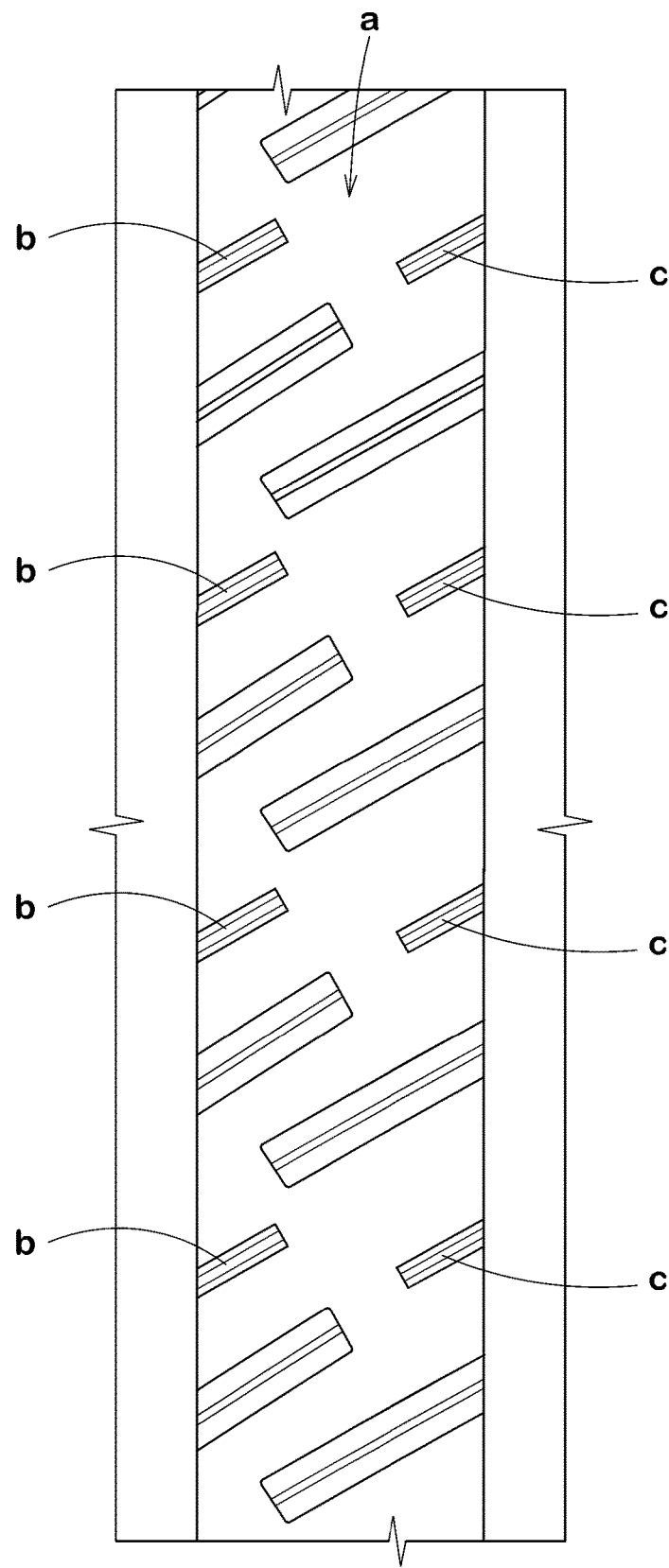

FIG.16  Reference Example
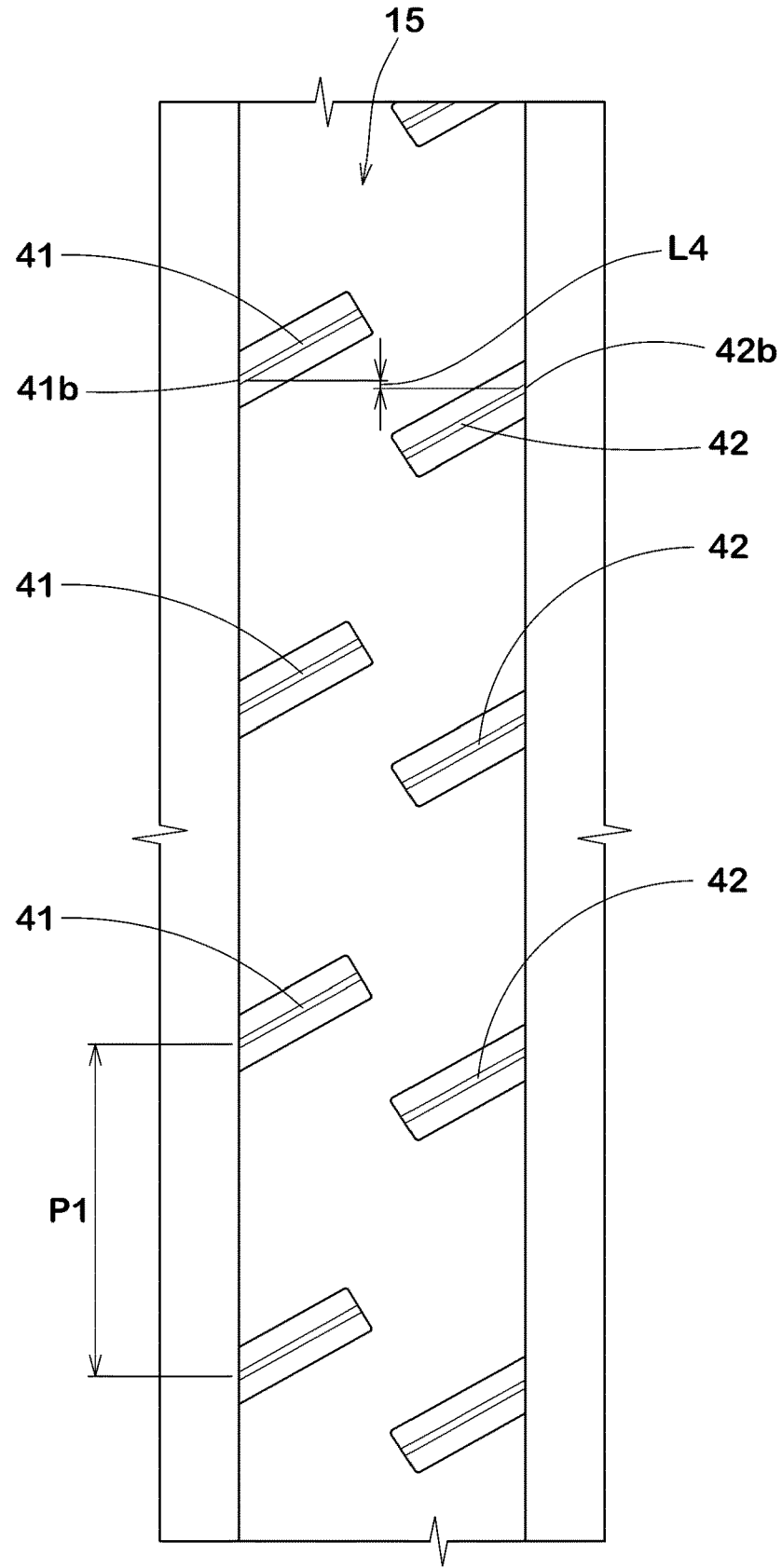

FIG.17 Comparative Example 2
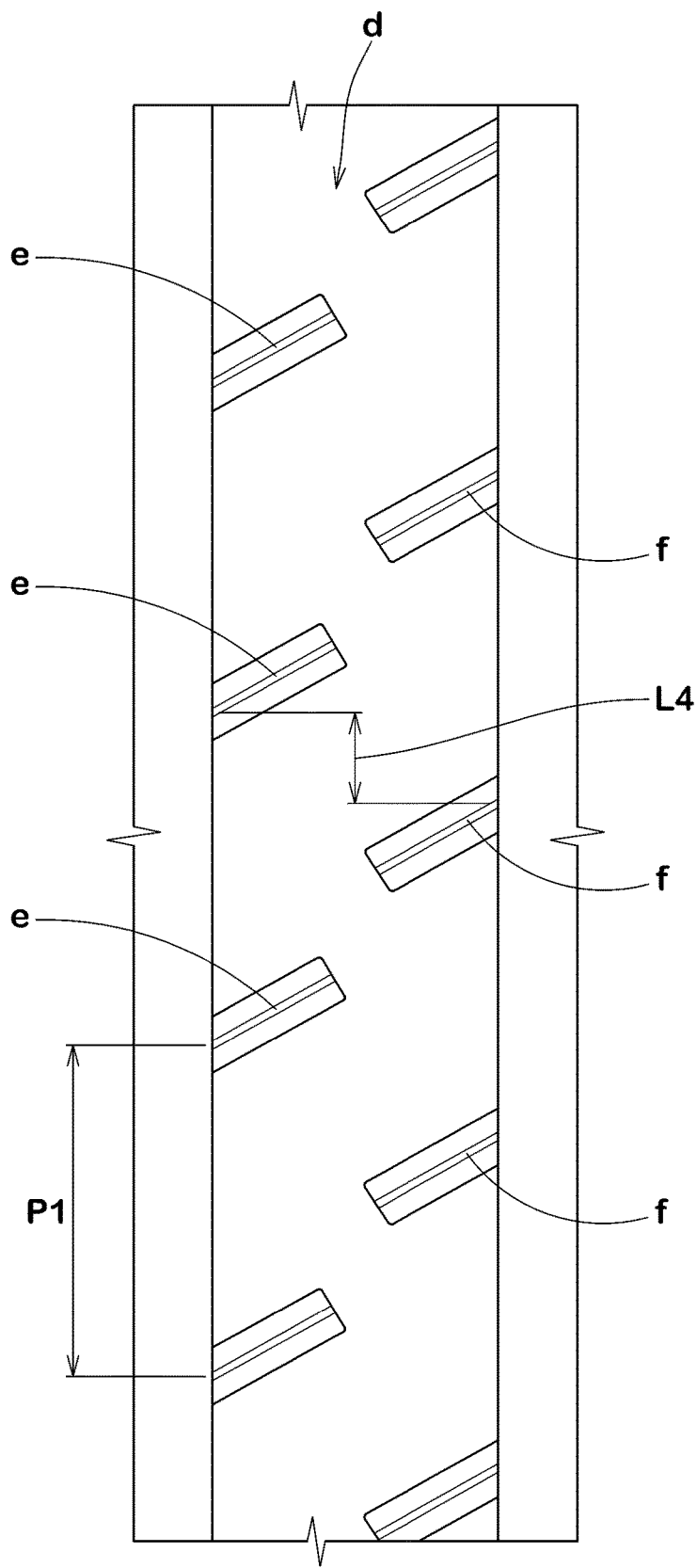

TIRE

RELATED APPLICATIONS

This application claims the benefit of foreign priority to Japanese Patent Applications No. JP2022-027772, filed Feb. 25, 2022, and No. JP2022-027771, filed Feb. 25, 2022, which are incorporated by reference in its entirety.

FIELD OF THE DISCLOSURE

The present disclosure relates to a tire.

BACKGROUND OF THE DISCLOSURE

Patent Document 1 below has proposed a tire that includes a crown land portion provided with a plurality of crown sipes. The tire is expected to improve steering stability on dry roads and on-snow performance in a well-balanced manner by improving the plurality of crown sipes.

Patent Document

[Patent document 1] Japanese Unexamined Patent Application Publication 2018-008585

SUMMARY OF THE DISCLOSURE

In recent years, as the performance of vehicles has improved, there has been a demand for further improvements in terms of steering stability on dry roads and on-snow performance.

The present disclosure has been made in view of the above circumstances and has a main object to provide a tire capable of exerting excellent on-snow performance while maintaining steering stability on dry roads.

In one aspect of the present disclosure, a tire includes a tread portion including a first tread edge, a second tread edge, and a crown land portion arranged between the first tread edge and the second tread edge. The crown land portion includes a first longitudinal edge extending in a tire circumferential direction on a first tread edge side, a second longitudinal edge extending in the tire circumferential direction on a second tread edge side, and a ground contact surface between the first longitudinal edge and the second longitudinal edge. The crown land portion is provided with a plurality of first crown sipes, a plurality of second crown sipes, and a plurality of third crown sipes. The first crown sipes, the second crown sipes, and the third crown sipes open at the ground contact surface via chamfer portions. The first crown sipes and the third crown sipes extend from the first longitudinal edge and have closed ends in the ground contact surface. The second crown sipes extend from the second longitudinal edge and have closed ends in the ground contact surface. Each of the first crown sipes has an opening width at the ground contact surface which is constant in a longitudinal direction of the sipe. Each of the second crown sipes has an opening width at the ground contact surface which is constant in a longitudinal direction of the sipe. Each of the third crown sipes has an opening width which decreases continuously from the first longitudinal edge toward the closed end thereof.

BRIEF DESCRIPTION OF THE DRAWINGS

FIG. 15 is an enlarged view of the crown land portion of Comparative Example 1;

FIG. 16 is an enlarged view of the crown land portion of Reference Example; and

FIG. 17 is an enlarged view of the crown land portion of Comparative Example 2.

DETAILED DESCRIPTION OF THE DISCLOSURE

One or more embodiments of the present disclosure will be described below with reference to the drawings.

Figure 1:
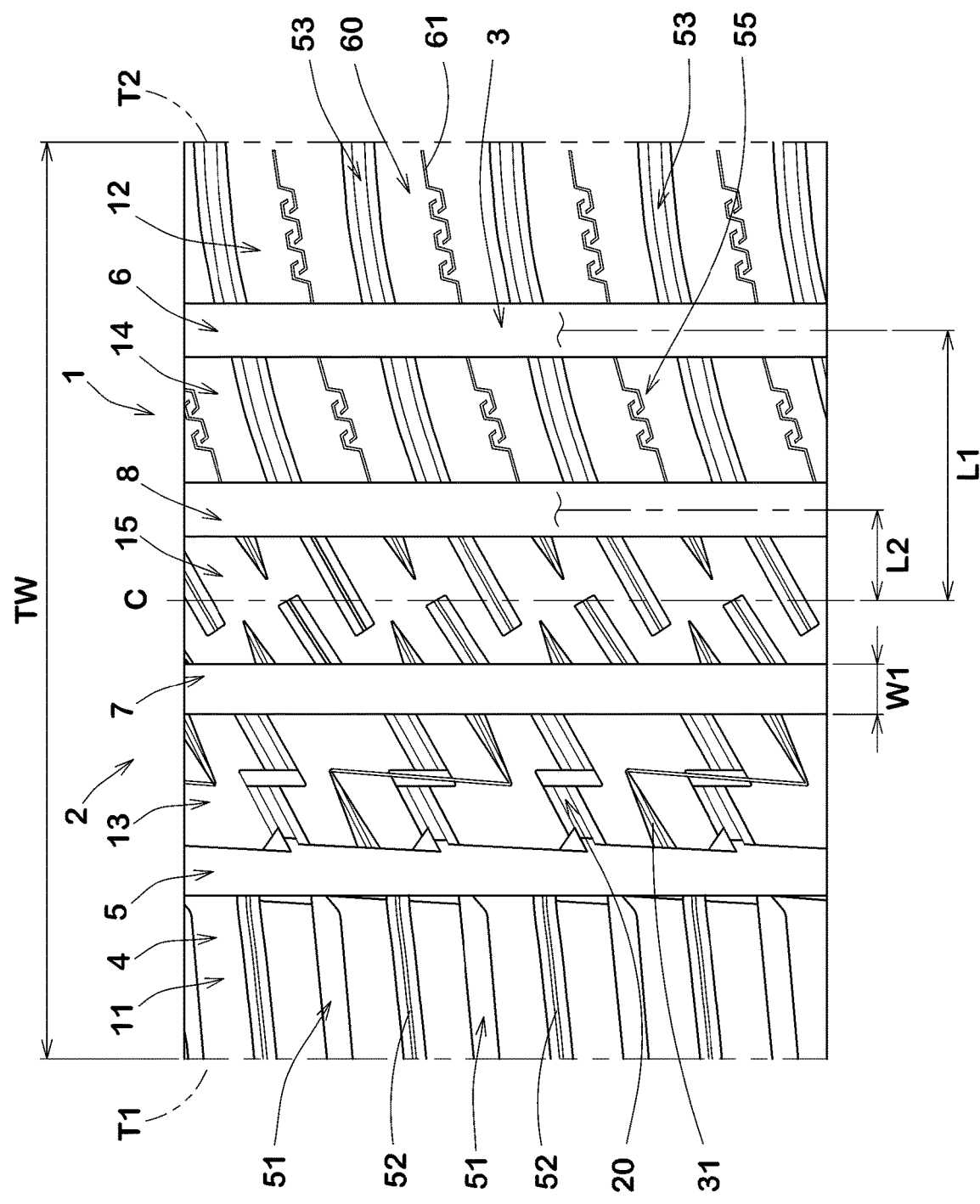
FIG. 1 is a development view of a tread portion showing an embodiment of the present disclosure.

FIG. 1 is a development view of a tread portion 2 of a tire 1 showing an embodiment of the present disclosure. The tire 1 according to the present embodiment, for example, is embodied as a winter tire and may be suitably used as a pneumatic tire for passenger cars. However, the present disclosure is not limited to such an embodiment, and may be applied to heavy-duty pneumatic tires and non-pneumatic tires in which the interior of the tire is not filled with pressurized air.

As illustrated in FIG. 1, the tread portion 2 according to the present disclosure includes a first tread edge T1, a second tread edge T2, a plurality of circumferential grooves 3 extending continuously in the tire circumferential direction between the first tread edge T1 and the second tread edge T2, and a plurality of land portions 4 divided by the circumferential grooves 3. As a preferred embodiment, the tire 1 according to the present embodiment is configured as a so-called five-rib tire in which the tread portion 2 is composed of four circumferential grooves 3 and five land portions 4.

In the present embodiment, the tread portion 2, for example, has a designated mounting direction on a vehicle. Thus, the first tread edge T1 is intended to be positioned outside the vehicle when installed, and the second tread edge T2 is intended to be positioned inside the vehicle when installed. The mounting direction on a vehicle is indicated, for example, by letters or symbols on a sidewall portion (not illustrated) of the tire 1. However, the tire 1 according to the present disclosure is not limited to such an embodiment and may be used without specifying the mounting direction on a vehicle.

The first tread edge T1 and the second tread edge T2 are the axial outermost edges of the ground contacting patch of the tire 1 which occurs under the condition such that the tire 1 under a normal state is grounded on a plane by zero camber angles with 70% of a standard tire load.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, the dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. Also, in the case of tires for which various standards are not specified, "standard tire load" refers to the maximum load that can be applied when using the tire according to the above-mentioned standards.

The circumferential grooves 3 include a first shoulder circumferential groove 5 and a second shoulder circumferential groove 6. Further, the circumferential grooves 3 include a first crown circumferential groove 7 and a second crown circumferential groove 8, which are arranged between the first and second shoulder circumferential grooves 5 and 6. The first shoulder circumferential groove 5 is located nearest to the first tread edge T1 among the circumferential grooves 3. The second shoulder circumferential groove 6 is located nearest to the second tread edge T2 among the circumferential grooves 3. The first crown circumferential groove 7 is located between the first shoulder circumferential groove 5 and the tire equator C. The second crown circumferential groove 8 is located between the second shoulder circumferential groove 6 and the tire equator C.

Preferably, a distance L1 in the tire axial direction from the tire equator C to the groove centerline of the first shoulder circumferential groove 5 or the second shoulder circumferential groove 6 is, for example, in a range from 25% to 35% of the tread width TW. Preferably, a distance L2 in the tire axial direction from the tire equator C to the groove centerline of the first crown circumferential groove 7 or the second crown circumferential groove 8 is, for example, in a range from 5% to 15% of the tread width TW. Note that the tread width TW is the distance from the first tread edge T1 to the second tread edge T2 in the tire axial direction under the normal state.

In the present embodiment, the second shoulder circumferential groove 6, the first crown circumferential groove 7, and the second crown circumferential groove 8 each extend in a straight manner in parallel with the tire circumferential direction. On the other hand, the first shoulder circumferential groove 5 has a zigzag groove edge on the tire equator C side. However, each of the circumferential grooves 3 is not limited to such a shape.

The circumferential grooves 3 have a groove width W1 which is preferably equal to or more than 3 mm. In addition, the groove width W1 of the circumferential grooves 3, for example, is preferably in a range from 3.0% to 7.0% of the tread width TW. A groove depth of the circumferential grooves 3 is in a range from 5 to 10 mm for passenger car tires, for example.

The five land portions 4 according to the present embodiment include a crown land portion 15 located between the first tread edge T1 and the second tread edge T2. The crown land portion 15 is sectioned between the first crown circumferential groove 7 and the second crown circumferential groove 8 and thus is located on the tire equator C. Further, the land portions 4 according to the present embodiment include a first middle land portion 13, a second middle land portion 14, a first shoulder land portion 11 and a second shoulder land portion 12. The first middle land portion 13 is sectioned between the first shoulder circumferential groove 5 and the first crown circumferential groove 7. The second middle land portion 14 is sectioned between the second shoulder circumferential groove 6 and the second crown circumferential groove 8. The first shoulder land portion 11 includes the first tread edge T1 and is located outwardly in the tire axial direction of the first shoulder circumferential groove 5. The second shoulder land portion 12 includes the second tread edge T2 and is located outwardly in the tire axial direction of the second shoulder circumferential groove 6.

Figure 2:
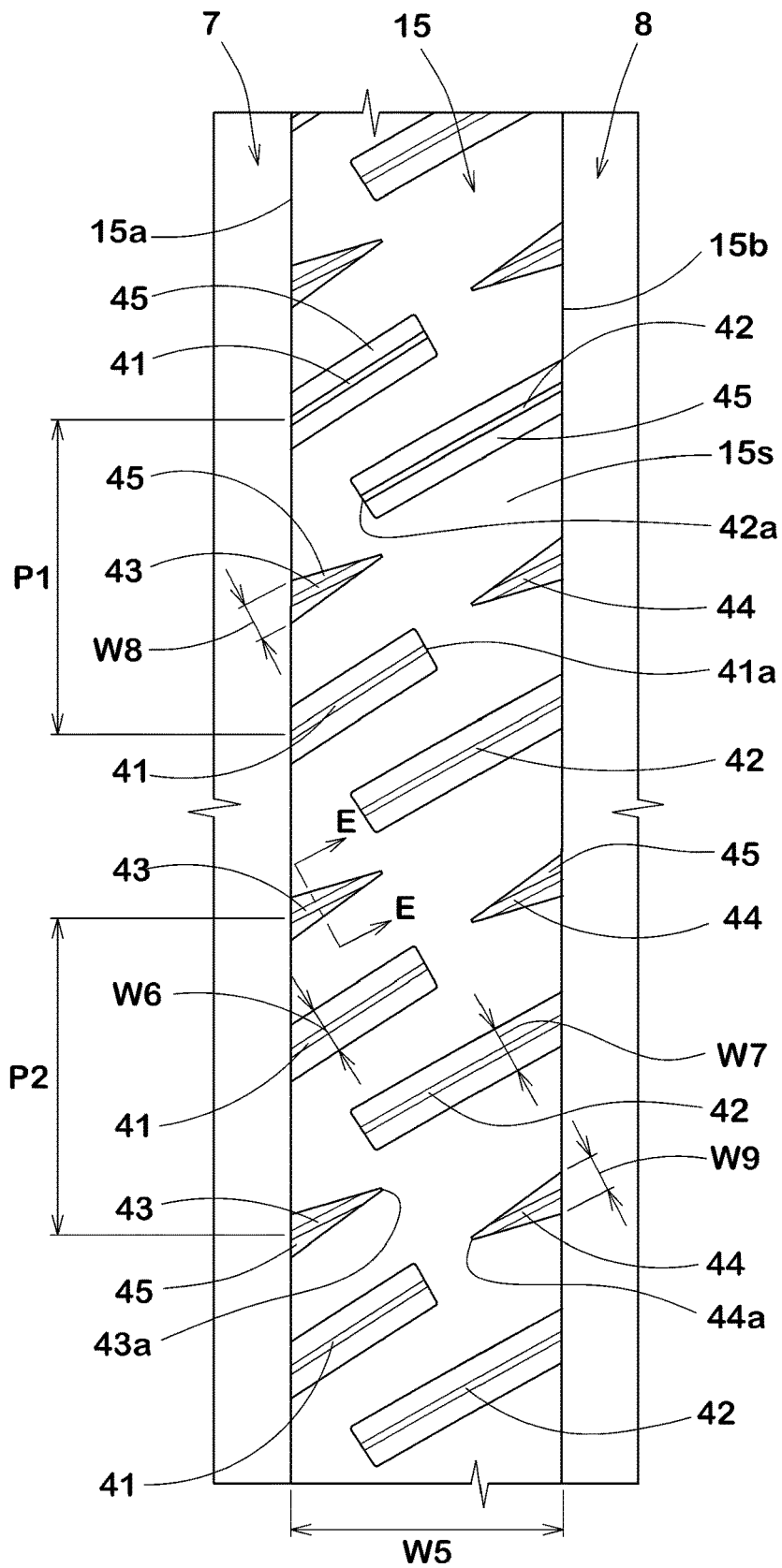
FIG. 2 is an enlarged view of a crown land portion of FIG. 1.

FIG. 2 illustrates an enlarged view of the crown land portion 15 of FIG. 1. As illustrated in FIG. 2, the crown land portion 15 includes a first longitudinal edge 15$a$ extending in the tire circumferential direction on a first tread edge T1 side, a second longitudinal edge 15$b$ extending in the tire circumferential direction on a second tread edge T2 side, and a ground contact surface 15$s$ between the first longitudinal edge 15$a$ and the second longitudinal edge 15$b$. In addition, the crown land portion 15 is provided with a plurality of first crown sipes 41, a plurality of second crown sipes 42 and a plurality of third crown sipes 43. Further, the crown land portion 15 according to the present embodiment is provided with a plurality of fourth crown sipes 44.

As used herein, "sipe" means an incision having a small width and includes a main body portion thereof having a width between two opposite inner walls being 1.5 mm or less. Further, the main body portion means a portion in which two opposite inner walls extend substantially parallel to each other in the tire radial direction. Here, "substantially parallel" means that the angle between two opposite inner walls is 10 degrees or less. As will be described later, the sipe may be provided with one or more chamfered portions. Further, the sipe may have a so-called flask bottom with an increased width at the bottom.

Figure 3:
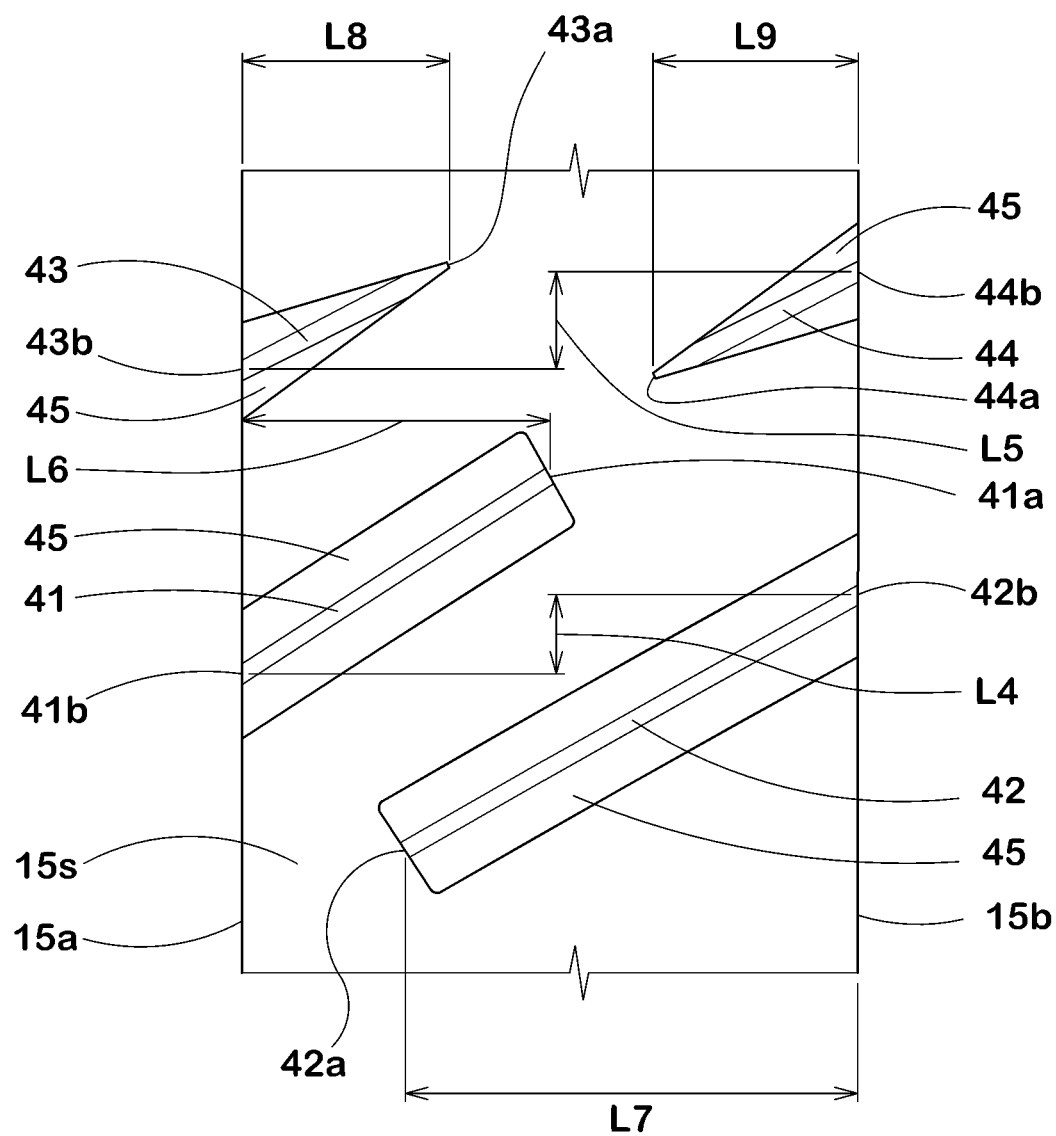
FIG. 3 is an enlarged view of a first crown sipe, a second crown sipe, a third crown sipe and a fourth crown sipe of FIG. 2.

FIG. 3 illustrates an enlarged view of one of the first crown sipes 41, one of the second crown sipes 42, one of the third crown sipes 43, and one of the fourth crown sipes 44. As illustrated in FIG. 3, in the present disclosure, the first crown sipes 41 extend from the first longitudinal edge 15$a$ and have closed end 41a in the ground contact surface 15s. The second crown sipes 42 extend from the second longitudinal edge 15b and have closed end 42a in the ground contact surface 15s. The third crown sipes 43 extend from the first longitudinal edge 15a and have closed end 43a in the ground contact surface 15s.

Figure 4:
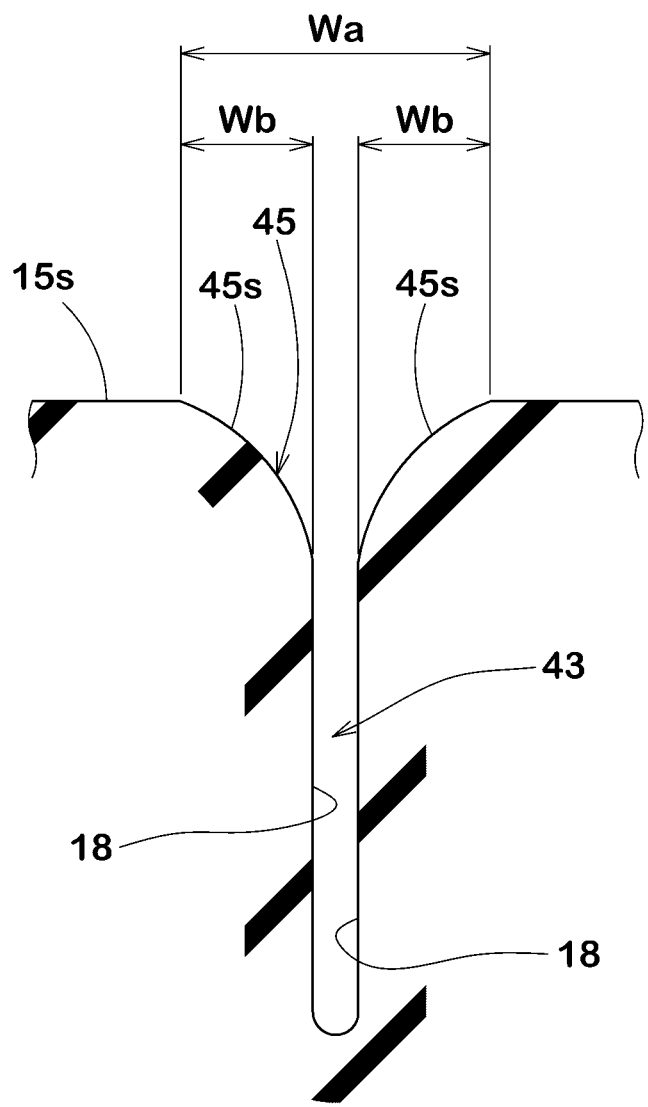
FIG. 4 is a cross-sectional view taken along the line E-E of FIG. 2.

FIG. 4 illustrates a cross-sectional view taken along the line E-E of FIG. 2, as an example of a sipe cross-sectional view. As illustrated in FIG. 4, the first crown sipes 41, the second crown sipes 42, and the third crown sipes 43 open at the ground contact surface 15s via chamfer portions 45. Each chamfer portion 45 includes an inclined surface 45s between the ground contact surface 15s and one of the sipe walls 18. In the present embodiment, each of the sipes has two chamfer portions 45 which are inclined surfaces 45s connected to the respective sipe walls 18. Each inclined surface 45s has a width Wb in a direction orthogonal to the longitudinal direction of the sipe. In the present embodiment, each inclined surface 45s is slightly curved in a direction convex outward in the tire radial direction. The inclined surface 45s may, for example, be planar. In addition, each sipe has an opening width Wa at the ground contact surface 15s. The opening width Wa corresponds to the distance in the direction orthogonal to the longitudinal direction of the sipe from an end of one of the inclined surfaces 45s on the ground contact surface 15s side to an end of the other one of the inclined surfaces 45s on the ground contact surface 15s side.

As illustrated in FIG. 2, an opening width W6 at the ground contact surface 15s of each of the first crown sipes 41 is constant in the longitudinal direction of the sipe, and an opening width W7 at the ground contact surface 15s of each of the second crown sipes 42 is constant in the longitudinal direction of the sipe. On the other hand, an opening width at the ground contact surface 15s of each of the third crown sipes 43 decreases continuously from the first longitudinal edge 15a toward the closed end 43a. By adopting the above configuration, the tire according to the present disclosure can exert excellent on-snow performance, while maintaining steering stability on dry roads (hereinafter simply referred to as "steering stability"). The mechanism can be as follows.

The tire according to the present disclosure include the crown land portion 15 being provided with the plurality of crown sipes having the closed ends. These sipes can improve on-snow performance while maintaining the rigidity of the crown land portion 15. In addition, since these sipes open via the chamfer portions 45, the ground pressure acting on the crown land portion 15 can be equalized by the chamfer portions 45, which can be expected to improve the steering stability and on-snow performance.

Further, since the opening width at the ground contact surface 15s of each of the third crown sipes 43 decreases toward the closed end, an axial middle region of the crown land portion 15 has sufficient ground contact area, which can ensure the steering stability. By such a mechanism, the tire 1 according to the present disclosure can exert excellent on-snow performance while maintaining the steering stability.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

The first crown sipes 41 and the second crown sipes 42 are inclined with respect to the tire axial direction in the same direction with each other. An angle of these sipes, for example, ranges from 25 to 35 degrees with respect to the tire axial direction.

Preferably, the opening width W7 at the ground contact surface 15s of each of the second crown sipes 42 ranges from 80% to 120% of the opening width W6 at the ground contact surface 15s of each of the first crown sipes 41, and in this embodiment, they are substantially the same with each other. Thus, uneven wear around the sipes can be suppressed.

The maximum opening width W8 at the ground contact surface 15s of each of the third crown sipes 43 is smaller than the opening width W6 at the ground contact surface 15s of each of the first crown sipes 41. Specifically, the maximum opening width W8 of each of the third crown sipes 43 ranges from 75% to 90% of the opening width W6 of each of the first crown sipes 41. In the third crown sipes 43 of the present embodiment, each chamfer portion is substantially eliminated at the closed end 43a, but each chamfer portion 45 is not limited to such an aspect, and one or more chamfer portions may have a chamfer width at the closed ends 43a. The same is true for the fourth crown sipes 44.

The fourth crown sipes 44 extend from the second longitudinal edge 15b and have closed end 44a in the ground contact surface 15s. In a tread plan view, the fourth crown sipes 44 have a shape different from the first crown sipes 41 and the second crown sipes 42. In the present embodiment, the fourth crown sipes 44 also open at the ground contact surface 15s via chamfer portions 45. In addition, it is preferable that an opening width at the ground contact surface 15s of each of the fourth crown sipes 44 decreases continuously from the second longitudinal edge 15b toward the closed end 44a. This ensures sufficient ground contact area in a middle region of the crown land portion 15, and thus the steering stability can be maintained.

An opening width W9 at the ground contact surface 15s of each of the fourth crown sipes 44 is smaller than the opening width W7 of each of the second crown sipes 42. Specifically, the opening width W9 of the fourth crown sipes 44 ranges from 75% to 90% of the opening width W7 of the second crown sipes 42. The fourth crown sipes 44 can help to enhance the balance between steering stability and on-snow performance.

As illustrated in FIG. 3, in the present embodiment, a minimum distance L4 in the tire circumferential direction between outer ends 41b on the first longitudinal edge 15a side of the first crown sipes 41 and outer ends 42b on the second longitudinal edge 15b side of the second crown sipes 42 is preferably equal to or less than 10% of a circumferential arrangement pitch P1 (shown in FIG. 2) of the first crown sipes 41. This makes it easier for water pushed away by a middle region of the crown land portion to be guided to the outer edges of these sipes when driving on wet roads, thus improving wet performance.

A length L6 in the tire axial direction of the first crown sipes 41, for example, ranges from 40% to 60% of a width W5 (shown in FIG. 2) in the tire axial direction of the ground contact surface 15s of the crown land portion 15. Note that in this document, a length of a sipe is measured by the center line of the sipe.

Preferably, the second crown sipes 42 extend beyond the axial center in the tire axial direction of the ground contact surface 15s of the crown land portion 15. The second crown sipes 42 have closed ends 42a which are located on the first longitudinal edge 15a side with respect to the closed ends 41a of the first crown sipes 41. Preferably, a length L7 in the tire axial direction of the second crown sipes 42 is greater than a length L6 in the tire axial direction of the first crown sipes 41. Specifically, the length L7 of the second crown sipes 42 preferably ranges from 65% to 85% of the width W5 in the tire axial direction of the ground contact surface 15s of the crown land portion 15. The second crown sipes 42 as such can improve on-snow performance and wet performance while maintaining steering stability.

The third crown sipes 43 and the fourth crown sipes 44 are inclined with respect to the tire axial direction in the same direction as the first crown sipes 41 and the second crown sipes 42, and angles of these sipes range from 25 to 35 degrees with respect to the tire axial direction, for example.

Preferably, a minimum distance L5 in the tire circumferential direction between outer ends 43b on the first longitudinal edge 15a side of the third crown sipes 43 and outer ends 44b the second longitudinal edge 15b side of the fourth crown sipes 44 is equal to or less than 10% of a circumferential arrangement pitch P2 (shown in FIG. 2) of the third crown sipes 43. This can improve wet performance further.

A length L8 in the tire axial direction of the third crown sipes 43 is smaller than the length L7 of the second crown sipes 42 and the length L6 of the first crown sipes 41. In addition, the closed ends 43a of the third crown sipes 43 are located on the first longitudinal edge 15a side with respect to the closed ends 44a of the fourth crown sipes 44. In some more preferred embodiments, the closed ends 43a of the third crown sipes 43 are located on the second longitudinal edge 15b side with respect to the closed ends 42a of the second crown sipes 42. The length L8 of the third crown sipes 43 ranges from 25% to 45% of the width W5 of the ground contact surface 15s of the crown land portion 15. Such third crown sipes 43 can help to improve steering stability, on-snow performance, and wet performance in a well-balanced manner.

From a similar point of view, a length L9 in the tire axial direction of the fourth crown sipes 44, for example, is smaller than the length L7 of the second crown sipes 42 and the length L6 of the first crown sipes 41. Specifically, the length L9 of the fourth crown sipes 44 preferably range from 25% to 45% of the width W5 of the ground contact surface 15s of the crown land portion 15.

Figure 5:
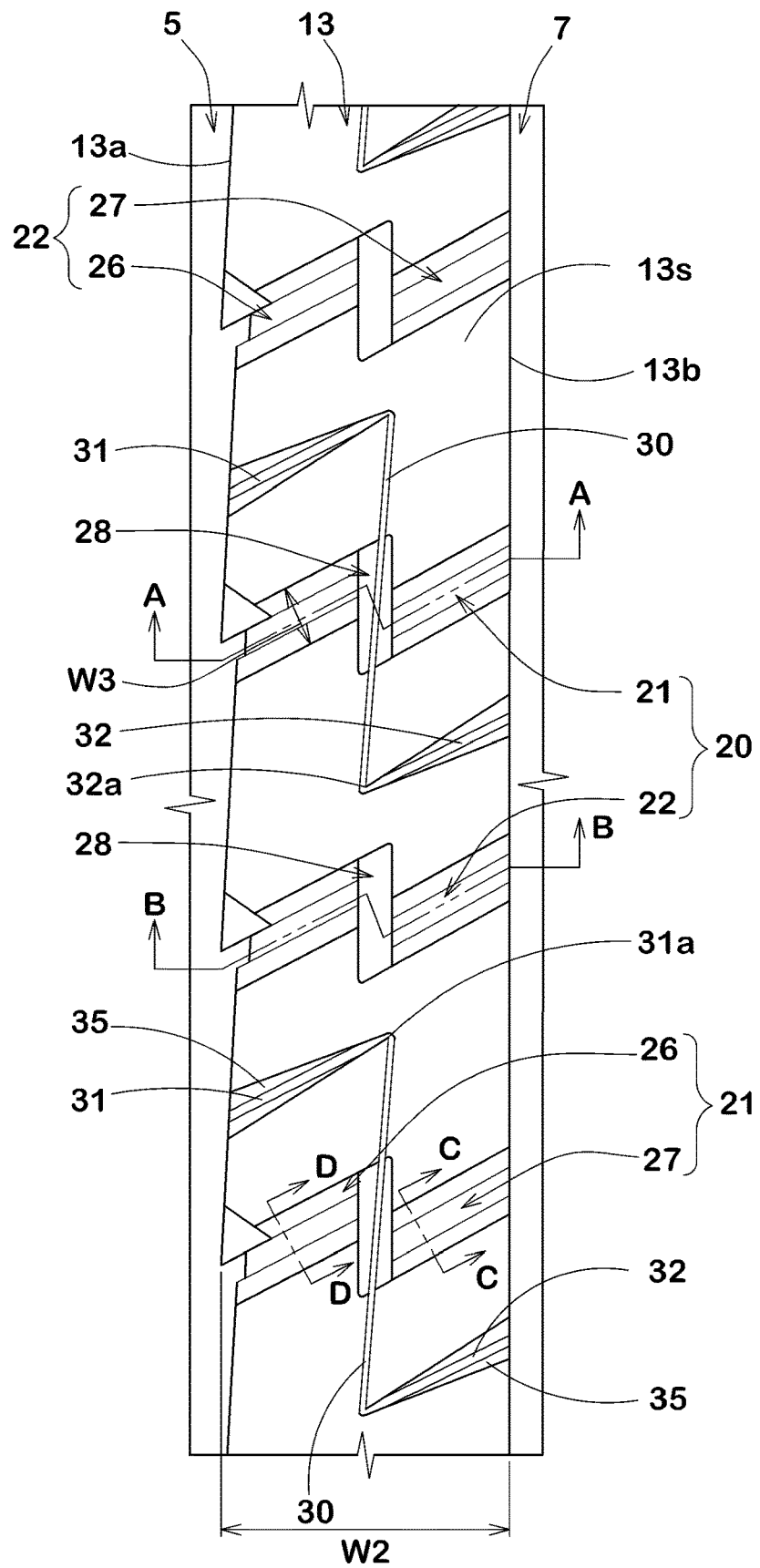
FIG. 5 is an enlarged cross-sectional view of a first middle land portion of FIG. 1.

FIG. 5 illustrates an enlarged view of the first middle land portion 13. As illustrated in FIG. 5, the first middle land portion 13 includes a first longitudinal edge 13a extending in the tire circumferential direction on the first tread edge T1 side, a second longitudinal edge 13b extending in the tire circumferential direction on the second tread edge T2 side, and a ground contact surface 13s between the first longitudinal edge 13a and the second longitudinal edge 13b. In addition, the first middle land portion 13 is provided with a plurality of middle lateral grooves 20. The middle lateral grooves 20, for example, are inclined with respect to the tire axial direction in the same direction as with the first crown sipes 41 (shown in FIG. 2).

Figure 6:
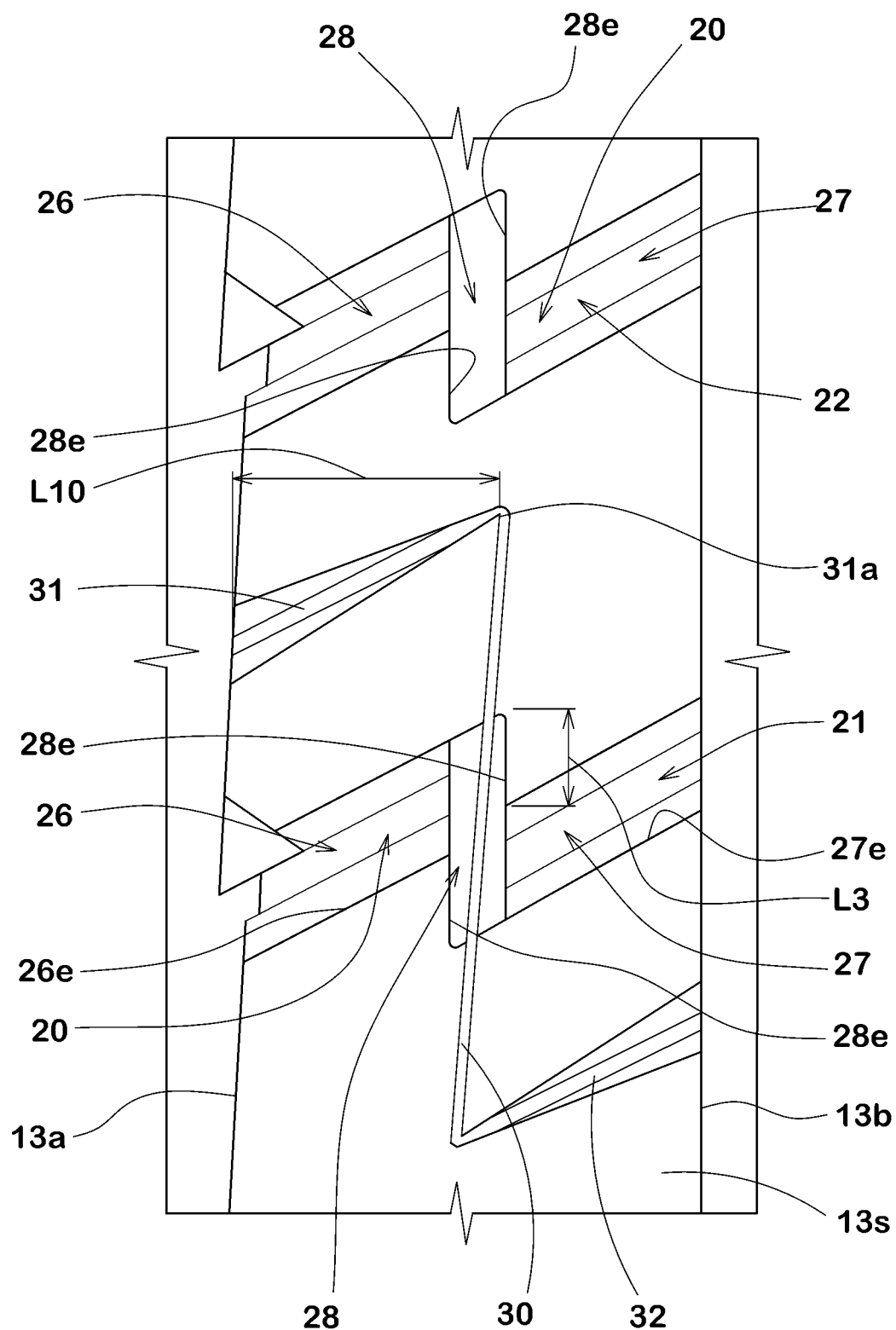
FIG. 6 is an enlarged view of a first middle lateral groove and a second middle lateral groove of FIG. 5.

FIG. 6 illustrates an enlarged view of two middle lateral grooves 20. Note that FIG. 6 is an enlarged view of a first middle lateral groove 21 and a second middle lateral groove 22, which will be described later. As illustrated in FIG. 6, at least one of the middle lateral grooves 20 includes a first groove portion 26 and a second groove portion 27. The first groove portion 26 extends in the tire axial direction from the first longitudinal edge 13a. The second groove portion 27 extends in the tire axial direction from the second longitudinal edge 13b.

In the present embodiment, the first groove portion 26 and the second groove portion 27 are displaced in the tire circumferential direction to form a pair of circumferential groove edges 28e extending in the tire circumferential direction between groove edges 26e of the first groove portion 26 and groove edges 27e of the second groove portion 27. In addition, the maximum groove depth of the first groove portion 26 is different from the maximum groove depth of the second groove portion 27. When driving on snow, the middle lateral grooves 20 can provide a large reaction force by shearing the snow that is strongly pressed inside (hereinafter, such reaction force is sometimes called "snow-column shear force"). Further, since the respective maximum depths of the first groove portion 26 and the second groove portion 27 are different, the shallower groove portion can maintain the rigidity of the first middle land portion 13 to maintain the steering stability, and the deeper groove portion can provide a larger snow-column shear force, which improves on-snow performance.

Furthermore, the circumferential groove edges 28e described above can provides frictional force in the tire axial direction and help to improve cornering performance on snow. Furthermore, the combination of the circumferential groove edges 28e, the first groove portions 26 and the second groove portions 27 allows snow entering the deeper groove portions to be pushed more strongly in the tire axial direction and exerts greater snow-column shear force.

As illustrated in FIG. 5 and FIG. 6, in the present embodiment, each of the middle lateral grooves 20 has the above-mentioned structure. In a tread plan view. the first groove portions 26 and the second groove portions 27 extend in the tire axial direction with a constant groove width W3 (shown in FIG. 5). The groove width W3 of the first groove portions 26 and the second groove portions 27, for example, ranges from 15% to 25% of a width W2 (shown in FIG. 5) in the tire axial direction of the ground contact surface 13s of the first middle land portion 13. An angle of the first groove portions 26 and the second groove portions 27 ranges from 25 to 35 degrees with respect to the tire axial direction, for example.

The middle lateral grooves 20, for example, include a plurality of the first middle lateral grooves 21 and a plurality of the second middle lateral grooves 22 which have different distribution of groove depths from one another. The first middle lateral grooves 21 and the second middle lateral grooves 22 are arranged alternately in the tire circumferential direction.

Figure 7:
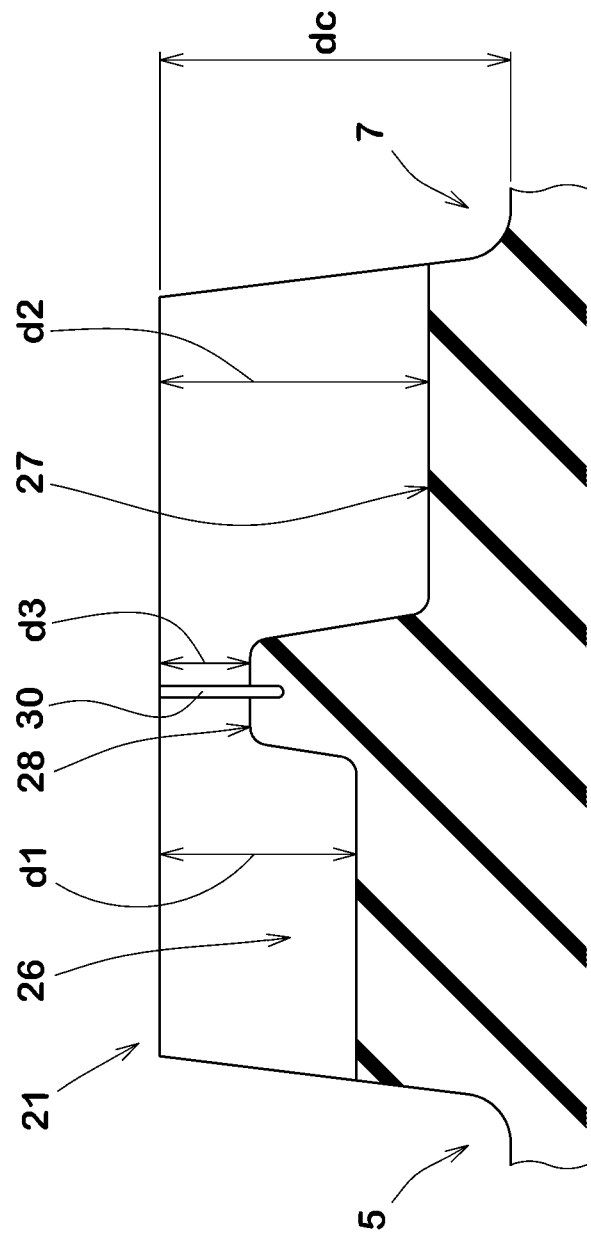
FIG. 7 is a cross-sectional view taken along the line A-A of FIG. 5.
Figure 8:
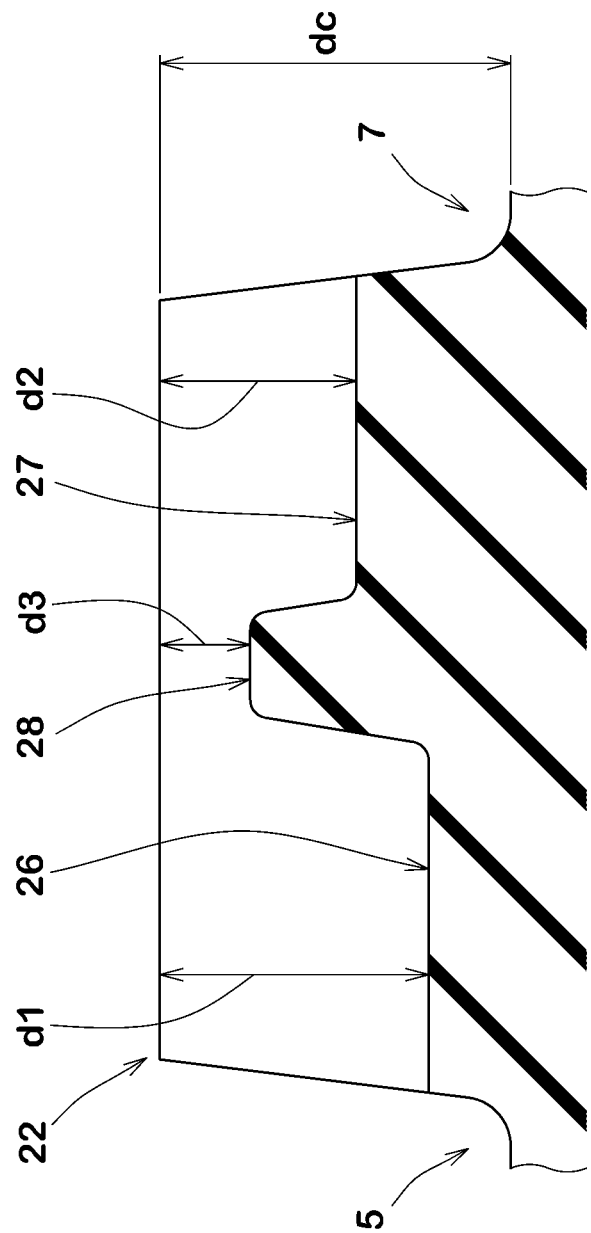
FIG. 8 is a cross-sectional view taken along the line B-B of FIG. 5.

FIG. 7 illustrates a cross-sectional view taken along the line A-A of FIG. 5. FIG. 7 is a cross-sectional view of one of the first middle lateral grooves 21 along a groove longitudinal direction thereof. FIG. 8 illustrates a cross-sectional view taken along the line B-B of FIG. 5. FIG. 8 is a cross-sectional view of one of the second middle lateral grooves 22 along a groove longitudinal direction thereof. As illustrated in FIG. 7 and FIG. 8, in the present embodiment, the first groove portions 26 and the second groove portions 27 of the first middle lateral grooves 21 and the first groove portions 26 and the second groove portions 27 of the second middle lateral grooves 22 extend in the groove longitudinal direction with respective constant groove depths.

As illustrated in FIG. 7, in each first middle lateral groove 21, the maximum groove depth d1 of the first groove portion 26 is smaller than the maximum groove depth d2 of the second groove portion 27. In each of the first middle lateral grooves 21, the groove depth d2 of the second groove portion 27, for example, ranges from 60% to 80% of a groove depth dc of the first crown circumferential groove 7. Further, in each of the first middle lateral grooves 21, the groove depth d1 of the first groove portion 26 ranges from 40% to 60% of the groove depth dc of the first crown circumferential groove 7. Preferably, the groove depth d1 of the first groove portion 26 ranges from 60% to 70% of the groove depth d2 of the second groove portion 27.

As illustrated in FIG. 8, the second middle lateral groove 22 has substantially the inverted shape of the first middle lateral groove 21. That is, in each of the second middle lateral grooves 22, the maximum groove depth d1 of the first groove portion 26 is greater than the maximum groove depth d2 of the second groove portion 27. In each of the second middle lateral grooves 22, the groove depth d1 of the first groove portion 26, for example, ranges from 60% to 80% of the groove depth dc of the first crown circumferential groove 7. Further, in each of the second middle lateral grooves 22, the groove depth d2 of the second groove portion 27 ranges from 40% to 60% of the groove depth dc of the first crown circumferential groove 7. Preferably, the groove depth d2 of the second groove portion 27 ranges from 60% to 70% of the groove depth d1 of the first groove portion 26.

In the present embodiment, since the first middle lateral grooves 21 and the second middle lateral grooves 22 are provided alternately in the tire circumferential direction, the steering stability and on-snow performance can be improved in a well-balanced manner.

Figure 9:
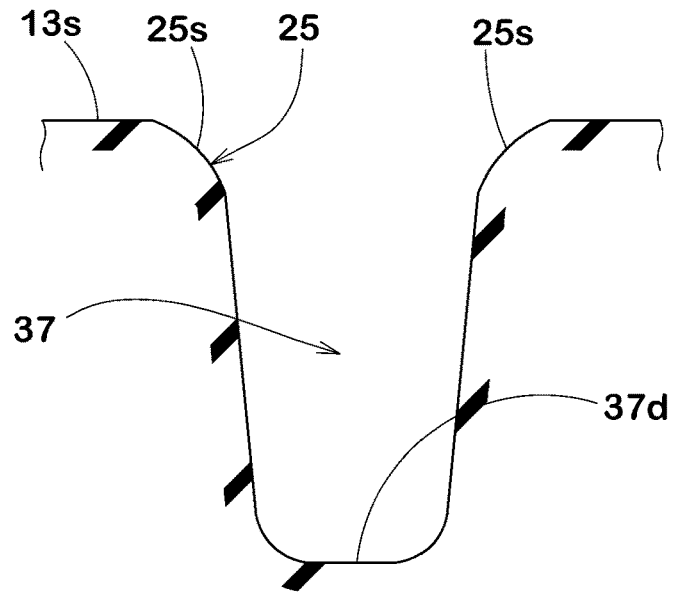
FIG. 9 is a cross-sectional view taken along the line C-C of FIG. 5.
Figure 10:
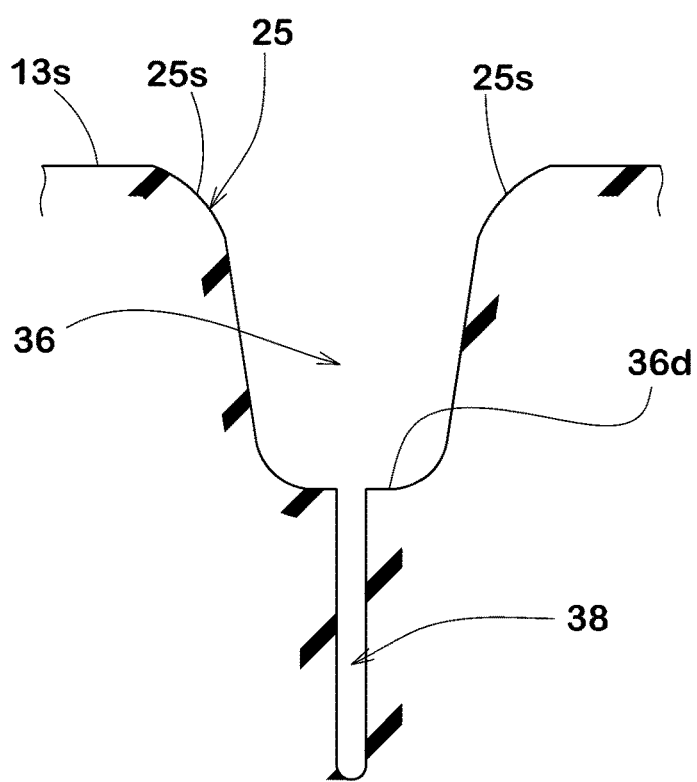
FIG. 10 is a cross-sectional view taken along the line D-D of FIG. 5.

FIG. 9 illustrates a cross-sectional view taken along the line C-C of FIG. 5. FIG. 9 is a cross-sectional view of the second groove portion 27 of each of the first middle lateral grooves 21, or the first groove portion 26 of each of the second middle lateral grooves 22 (hereinafter, sometimes referred to collectively as deep groove portion 37). FIG. 10 illustrates a cross-sectional view take along the line D-D of FIG. 5. FIG. 10 is a cross-sectional view of the first groove portion 26 of each of the first middle lateral grooves 21, or the second groove portion 27 of each of the second middle lateral grooves 22 (hereinafter, sometimes referred to collectively as shallow groove portion 36).

As illustrated in FIG. 9 and FIG. 10, the deep groove portion 37 and the shallow groove portion 36 preferably open at the ground contact surface via chamfer portions 25. Each chamfer portion 25 includes an inclined surface 25s between the ground contact surface and one of the groove walls. In the present embodiment, each inclined surface 25s is slightly curved in a direction convex outward in the tire radial direction. The inclined surface 25s may, for example, be planar. Such a chamfer portion 25 can help to equalize the ground pressure acting on the ground contact surface 13s to improve uneven wear resistance.

As illustrated in FIG. 9, the deep groove portion 37, for example, is configured to include a flat groove bottom 37d. On the other hand, as illustrated in FIG. 10, the shallow groove portion 36 includes a groove bottom 36d which is provided with a groove bottom sipe 38 extending inwardly in the tire radial direction. Such a groove bottom sipe 38 can facilitate the opening of the shallow groove portion 36 appropriately and help to improve on-snow performance. Note that the above-mentioned depths d1 and d2 of the first groove portion 26 of the first middle lateral grooves 21 and the second groove portion 27 of the second middle lateral grooves 22, respectively, mean a depth without including the groove bottom sipe 38. In addition, in FIG. 7 and FIG. 8, the groove bottom sipes 38 are not illustrated. In some preferred embodiments, a total depth from the ground contact surface to a bottom of the groove bottom sipe 38 is smaller than a depth of the deep groove portion 37. This can improve the balance between steering stability and on-snow performance.

In the present embodiment as illustrated in FIG. 6, each of the pair of groove edges of each middle lateral groove 20 includes a circumferential groove edge 28e. Each circumferential groove edge 28e, for example, is located in the central area when the ground contact surface 13s of the first middle land portion 13 is divided into three equal portions in the tire axial direction. In the present embodiment, a pair of circumferential groove edges 28e are positioned such that the axial center position of the ground contact surface 13s of the first middle land portion 13 is located therebetween. In addition, the pair of circumferential groove edges 28e extends along the tire circumferential direction, preferably extending in parallel with the tire circumferential direction. For example, an angle of the pair of circumferential groove edges 28e is preferably equal to or less than 10 degrees, more preferably equal to or less than 5 degrees with respect to the tire circumferential direction. Preferably, a length L3 in the tire circumferential direction of the pair of circumferential groove edges 28e is smaller than the maximum width of the first groove portion 26 and the second groove portion 27. Specifically, the length L3 ranges from 75% to 95% of the maximum groove width. Such a pair of circumferential groove edges 28e can improve cornering performance when driving on snow, while suppressing uneven wear of the land portion.

Each of the middle lateral grooves 20 includes a circumferential groove portion 28 arranged between the first groove portion 26 and the second groove portion 27. In the present embodiment, the area between one of the pair of circumferential groove edges 28e and its imaginary extension line extending in the longitudinal direction and the other one of the pair of circumferential groove edges 28e and its imaginary extension line extending in the longitudinal direction is configured as the circumferential groove portion 28, for example.

As illustrated in FIG. 7 and FIG. 8, the maximum groove depth d3 of the circumferential groove portions 28 is smaller than the maximum groove depth d1 of the first groove portions 26 and the maximum groove depth d2 of the second groove portions 27. Specifically, the maximum groove depth d3 of the circumferential groove portions 28 ranges from 20% to 30% of the groove depth dc of the first crown circumferential groove 7. The circumferential groove portions 28 can increase the rigidity of a middle region of the first middle land portion 13 and improve uneven wear resistance.

As illustrated in FIG. 5, it is preferable that the first middle land portion 13 is provided with at least one circumferential sipe 30 extending in the tire circumferential direction. In the present embodiment, the first middle land portion 13 is provided with a plurality of circumferential sipes 30 spaced in the tire circumferential direction. In addition, each circumferential sipe 30 according to the present embodiment extends from the ground contact surface 13s of the first middle land portion 13 to a bottom thereof with a constant sipe width. The circumferential sipes 30 can provide a large frictional force in the tire axial direction when driving on wet or snow.

Preferably, each circumferential sipe 30, for example, is located in the central area when the ground contact surface 13s of the first middle land portion 13 is divided into three equal portions in the tire axial direction. An angle of each circumferential sipe 30 with respect to the tire circumferential direction is, for example, equal to or less than 10 degrees, preferably equal to or less than 5 degrees. Such a circumferential sipe 30 can provide a large frictional force in the tire axial direction when driving on snow.

The circumferential sipes 30, for example, extend across some middle lateral grooves 20 in the tire circumferential direction. In some preferred embodiments, the circumferential sipes 30 are arranged to extend across the respective first middle lateral grooves 21 but not to be communicated with the second middle lateral grooves 22. More specifically, the circumferential sipes 30 extend across the respective circumferential groove portions 28 of the first middle lateral grooves 21. Thus, at the groove bottoms of the circumferential groove portions 28, the circumferential sipes 30 are formed as the groove bottom sipes. On the other hand, the second middle lateral grooves 22 do not have such a structure. As a result, the steering stability, on-snow performance, and uneven wear are resistance can be improved in a well-balanced manner.

As illustrated in FIG. 5, the first middle land portion 13 is further provided with a plurality of the first middle sipes 31 and a plurality of second middle sipes 32. The first middle sipes 31 extend from the first longitudinal edge 13a, have a length L10 in the tire axial direction, and are in communication with the respective circumferential sipes 30. The second middle sipes 32 extend from the second longitudinal edge 13b and are in communication with the respective circumferential sipes 30. In some preferred embodiments, ends of the first middle sipes 31 in the ground contact surface 13s are connected to ends 31a on a first side in the tire circumferential direction of the respective circumferential sipes 30. Ends 32a of the second middle sipes 32 in the ground contact surface 13s are connected to ends on a second side in the tire circumferential direction of the respective circumferential sipes 30. The first middle sipes 31 and the second middle sipes 32 work together with the circumferential sipe 30 to provide multi-directional frictional force, further improving on-snow performance.

The first middle sipes 31 and the second middle sipes 32, for example, are inclined with respect to the tire axial direction in the same direction as the middle lateral grooves 20. An angle of these sipes with respect to the tire axial direction, for example, ranges from 25 to 35 degrees. In some preferred embodiments, an angle between the first middle sipes 31 and the circumferential sipes 30 is an acute angle. Similarly, an angle between the second middle sipes 32 and the circumferential sipes 30 is an acute angle. This makes it easier for the corners between the middle sipes and the circumferential sipes to bite into a road surface when driving on snow, thereby exhibiting excellent performance on snow.

The first middle sipes 31 and the second middle sipes 32 open at the ground contact surface 13s via chamfer portions 35. The configuration of the chamfer portions 45 of crown sipes (shown in FIG. 4) can be applied to the chamfer portions 35 of these sipes, and thus the details of the chamfer portions 35 will not be described here. The chamfer portions 35 can help to equalize the ground pressure acting on the ground contact surface 13s and to improve the steering and uneven wear resistance.

As illustrated in FIG. 5, it is preferable that each of the first middle sipes 31 has an opening width at the ground contact surface 13s, and the opening width decreases toward the circumferential sipe 30. Similarly, it is preferable that each of the second middle sipes 32 has an opening width at the ground contact surface 13s, and the opening width decrease toward the circumferential sipe 30. This ensures the ground contact area in a middle region of the first middle land portion 13 and maintains the steering stability.

Figure 11:
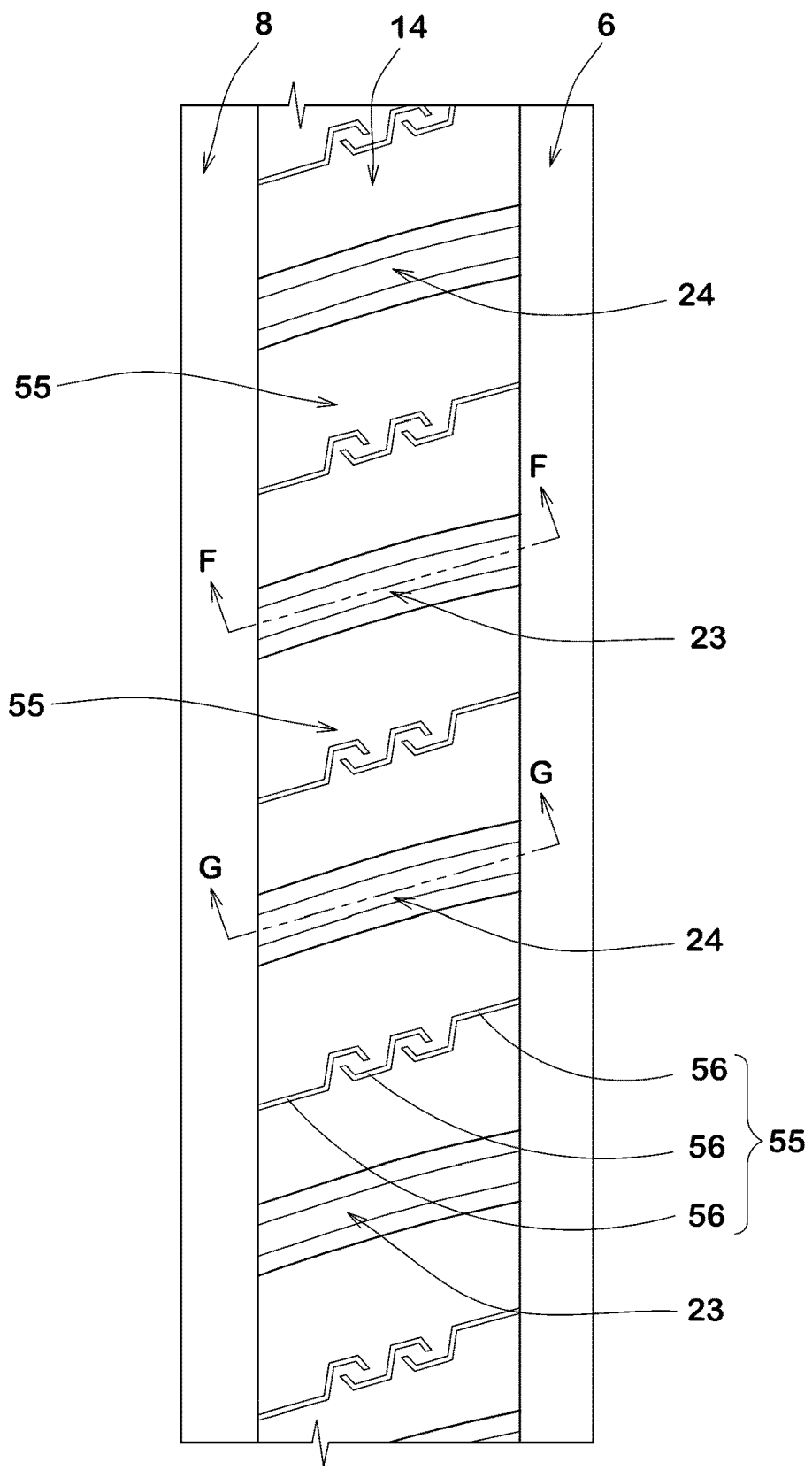
FIG. 11 is an enlarged view of a second middle land portion of FIG. 1.

FIG. 11 illustrates an enlarged view of the second middle land portion 14. As illustrated in FIG. 11, the second middle land portion 14 is provided with third middle lateral grooves 23 and fourth middle lateral grooves 24 which are arranged alternately in the tire circumferential direction. The third middle lateral grooves 23 and the fourth middle lateral grooves 24 have the same shape in a tread plan view, and extend across the second middle land portion 14 entirely in the tire axial direction. In addition, the third middle lateral grooves 23 and the fourth middle lateral grooves 24 are inclined with respect to the tire axial direction in the same direction as the middle lateral grooves 20 (shown in FIG. 5). An angle of the third middle lateral grooves 23 and the fourth middle lateral grooves 24 with respect to the tire axial direction is smaller than an angle of the middle lateral grooves 20 (shown in FIG. 5) with respect to the tire axial direction and an angle of the sipes provided on the crown land portion 15 (shown in FIG. 2) with respect to the tire axial direction. Specifically, an angle of the third middle lateral grooves 23 and the fourth middle lateral grooves 24 with respect to the tire axial direction, for example, ranges from 10 to 20 degrees. On the other hand, the third middle lateral grooves 23 and the fourth middle lateral grooves 24 differ in their internal configuration.

Figure 12:
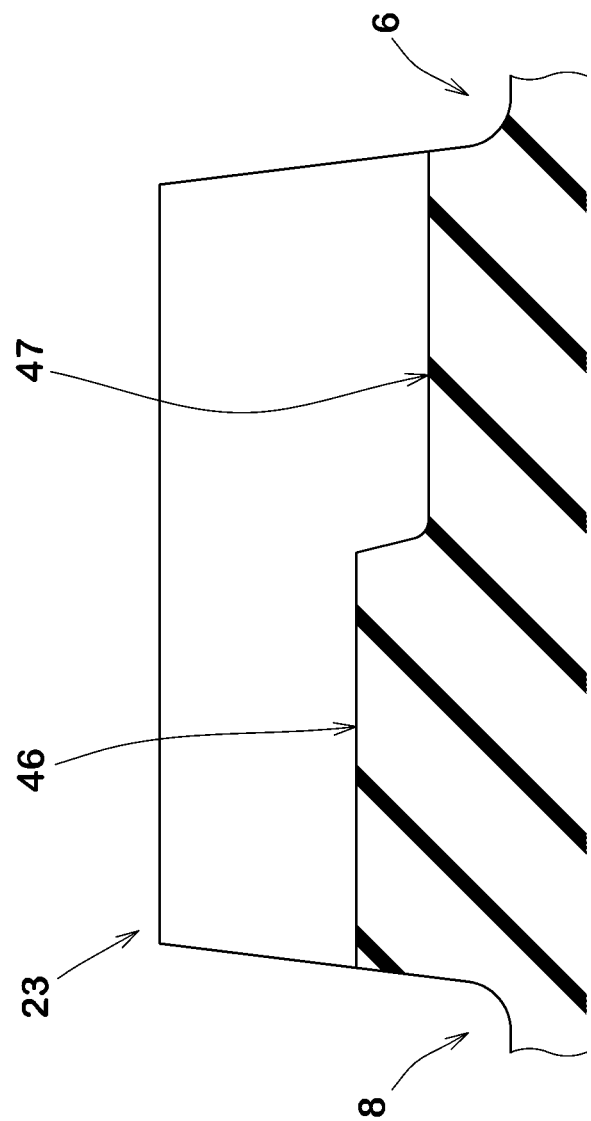
FIG. 12 is a cross-sectional view taken along the line F-F of FIG. 11.
Figure 13:
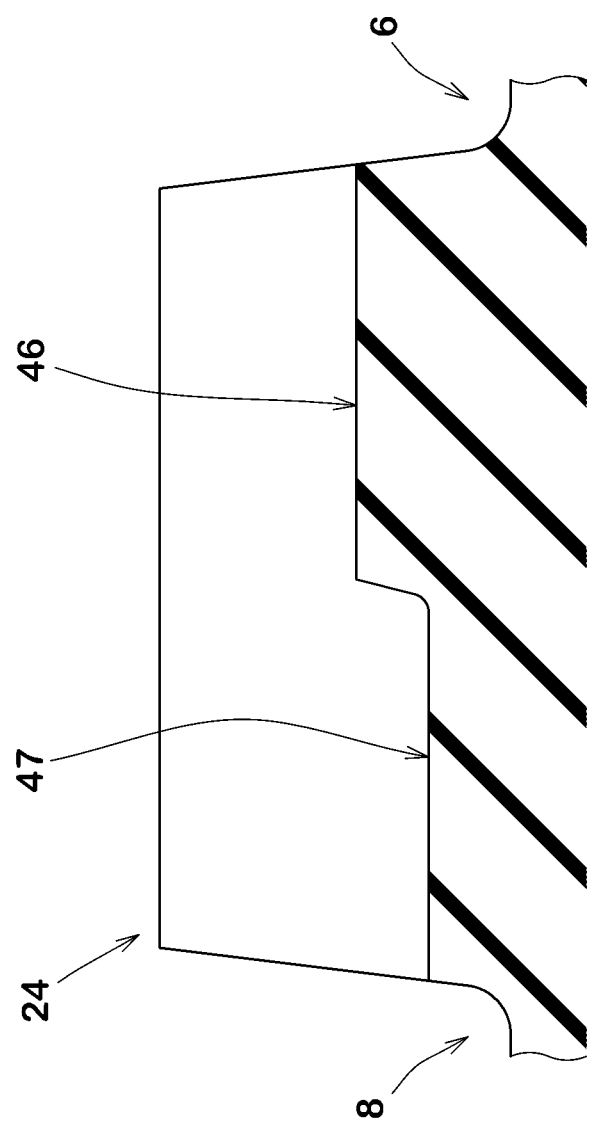
FIG. 13 is a cross-sectional view taken along the line G-G of FIG. 11.

FIG. 12 illustrates a cross-sectional view taken along the line F-F of FIG. 11. As illustrated in FIG. 12, the third middle lateral grooves 23 each have a shallow groove portion 46 on the second crown circumferential groove 8 side and a deep groove portion 47 on the second shoulder circumferential groove 6 side. FIG. 13 illustrates a cross-sectional view taken along the line G-G of FIG. 11. As illustrated in FIG. 13, the fourth middle lateral groove 24 have substantially the inverted shape of the third middle lateral grooves 23. That is, the fourth middle lateral grooves 24 each have a deep groove portion 47 on the second crown circumferential groove 8 side and a shallow groove portion 46 on the second shoulder circumferential groove 6 side. In this embodiment, the third middle lateral grooves 23 and the fourth middle lateral grooves 24 are provided alternately in the tire circumferential direction, which improve the uneven wear resistance and the steering stability.

For the shallow groove portions 46 of the third middle lateral grooves 23 and the fourth middle lateral grooves 24, the shallow groove portions 36 of the middle lateral grooves 20 (shown in FIG. 10) of the middle lateral grooves 20 described above can be applied to the shallow groove portions 46 of the third middle lateral grooves 23 and the fourth middle lateral grooves 24. Similarly, for the deep groove portions 47 of the third middle lateral grooves 23 and the fourth middle lateral grooves 24, the deep groove portions 37 of the middle lateral grooves 20 (shown in FIG. 9) of the middle lateral grooves 20 described above can be applied to the deep groove portions 47 of the third middle lateral grooves 23 and the fourth middle lateral grooves 24.

As illustrated in FIG. 11, the second middle land portion 14 is provided with a plurality of middle sipe groups 55 each of which includes a plurality of bent sipes 56 arranged in the tire axial direction. The middle sipe groups 55 are spaced in the tire circumferential direction. In the present embodiment, each middle sipe group 55 is configured such that the plurality of bent sipes 56 is arranged so as to overlap partially in the tire axial direction with each other. The bent sipes 56 each include a convex part on one side or the other in the tire circumferential direction. The middle sipe groups 55 are difficult to open during braking and driving, so that snow and ice are less likely to clog the inside of the sipes, and thus excellent on-snow performance can be maintained.

Figure 14:
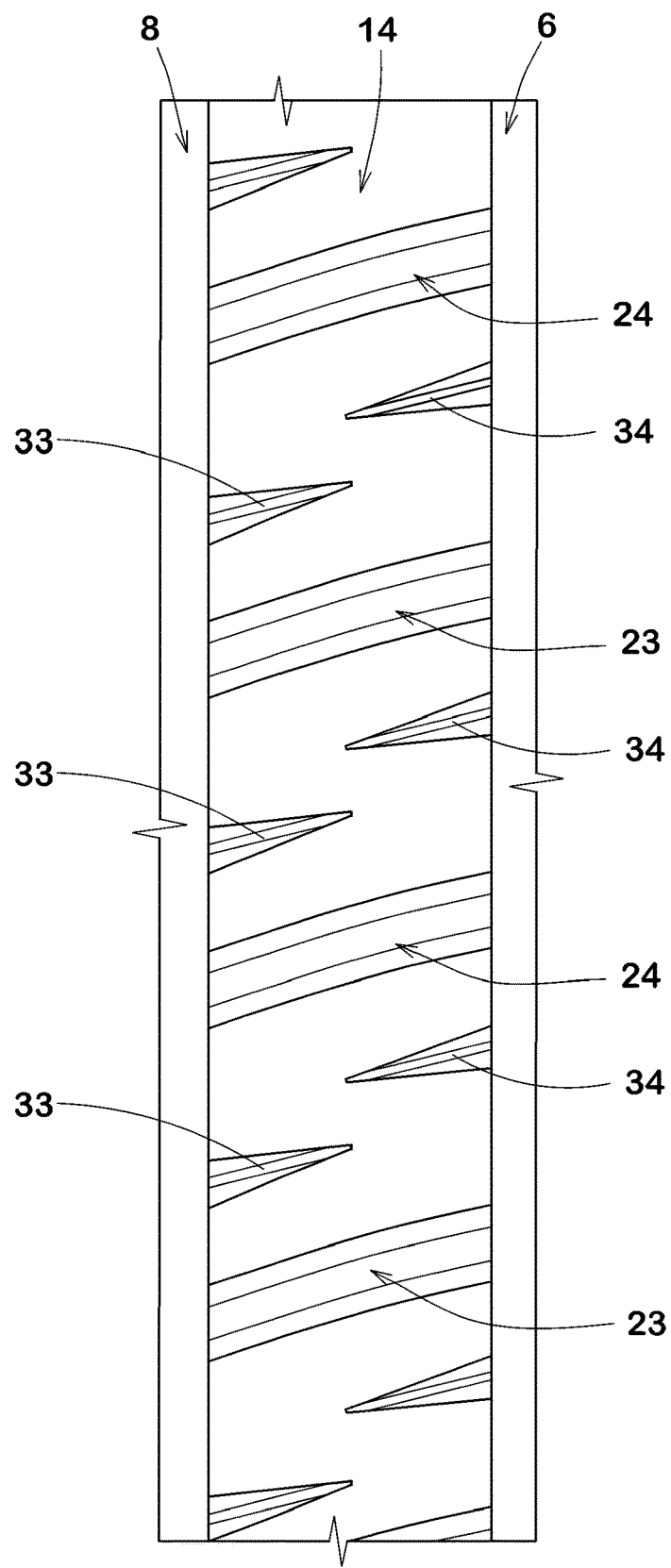
FIG. 14 is an enlarged view of the second middle land portion in accordance with another embodiment of the present disclosure.

In the present disclosure, it is not limited to the second middle land portion 14 shown in FIG. 11. FIG. 14 illustrates an enlarged view of the second middle land portion 14 in accordance with another embodiment of the present disclosure. As illustrated in FIG. 14, the second middle land portion 14 is provided with a plurality of third middle sipes 33 and a plurality of fourth middle sipes 34 in addition to the above-mentioned third middle lateral grooves 23 and the fourth middle lateral grooves 24. The third middle sipes 33 extend from the second crown circumferential groove 8 and have closed ends in the ground contact surface of the second middle land portion 14. The fourth middle sipes 34 extend from the second shoulder circumferential grooves 6 and have closed end in the ground contact surface. The third middle sipes 33 and the fourth middle sipes 34, for example, are inclined with respect to the tire axial direction in the same direction as the third middle lateral grooves 23 and the fourth middle lateral grooves 24. An angle of these sipes, for example, ranges from 10 to 20 degrees with respect to the tire axial direction. The structure of the above-mentioned first middle sipes 31 and second middle sipes 32 can be applied to the third middle sipes 33 and the fourth middle sipes 34.

In yet another embodiment of the second middle land portion 14, for example, in a region between the third middle lateral groove 23 and the fourth middle lateral groove 24 which are adjacent to each other in the circumferential direction of the tire, at least one middle sipe group 55 described above (shown in FIG. 11), at least one third middle sipe 33 and at least one fourth middle sipe 34 shown in FIG. 14 may be arranged (not illustrated). Such a sipe arrangement can help to further enhance on-snow performance.

As illustrated in FIG. 1, the first shoulder land portion 11 is provided with a plurality of first shoulder lateral grooves 51 and a plurality of first shoulder sipes 52. The first shoulder lateral grooves 51 and the first shoulder sipes 52 extend, for example, from the first shoulder circumferential groove 5 to at least the first tread edge T1. In addition, the second shoulder land portion 12 is provided with a plurality of second shoulder lateral grooves 53 and a plurality of shoulder sipe groups 60 each of which includes a plurality of bent sipes 61 arranged in the tire axial direction. The shoulder sipe groups 60 have substantially the same configuration as the middle sipe groups 55 described above. These grooves and sipes can help to further improve on-snow performance.

Although the tire according to one or more embodiments of the present disclosure has been described in detail above, the present disclosure is not limited to the specific embodiments described above, and can be embodied in various ways.

Example

As Example, pneumatic tires of size 245/40ZR18 with the basic pattern of FIG. 1 were prepared. As Comparative Example 1, tires each having the crown land portion "a" shown in FIG. 15 were also prepared. The crown land portion "a" is provided with the third crown sipes "b" and the fourth crown sipes "c" extending with a constant opening width. The tires of Comparative Example 1 have substantially the same configuration as the tires of Example, except for the above-mentioned items.

Then, the steering stability on a dry road and on-snow performance were tested for Comparative Example 1 and Example. The common specifications and test methods of each test tire are as follows.

Rim: 18×8.5J
Tire pressure: 240 kPa on all wheels
Test vehicle: 2000 cc displacement, rear-wheel drive vehicle
Tire position: All wheels Steering Stability on Dry Road Test:

The steering stability of the above test vehicle on a dry road was evaluated by the driver's sensory evaluation. The test results are indicated using a score of 100, where the steering stability of Comparative Example 1 is set to 100, and the higher the score, the better the steering stability.

On-Snow Performance Test:

The on-snow performance of the above test vehicle on a snowy road was evaluated by the driver's sensory evaluation. The test results are indicated using a score of 100, where the on-snow performance of Comparative Example 1 is set to 100, and the higher the score, the better the on-snow performance.

Table 1 shows the test results.

TABLE 1

|  | Comparative Example 1 | Example |
|---|---|---|
| Steering stability on dry road (score) | 100 | 105 |
| On-snow performance (score) | 100 | 105 |

The test results show that the tires of Example exhibit excellent on-snow performance while maintaining better steering stability on a dry road.

Pneumatic tires of size 245/40ZR18 were prepared as Comparative Example 2, Reference Example and Example. Reference Example has a crown land portion 15 shown in FIG. 16. The crown land portion 15 shown in FIG. 16 includes features of the embodiment shown in FIG. 1, and the minimum distance L4 in the tire circumferential direction between the outer ends 41*b* of the first crown sipes 41 and the outer ends 42*b* of the second crown sipes 42 is about 4% of the circumferential arrangement pitch of the first crown sipes. Each tire of Example has the crown land portion 15 shown in FIG. 2, and the distance is about 4% of the circumferential arrangement pitch P1.

On the other hand, the tires of Comparative Example 2 each has the crown land portion "d" shown in FIG. 17. The crown land portion "d" is such that the minimum distance L4 in the tire circumferential direction between the outer ends of the first crown sipes "e" and the outer ends of the second crown sipes "f" is about 27% of the circumferential arrangement pitch P1. The crown land portion of Comparative Example 2 is substantially the same as the crown land portion 15 of Reference Example and Example, except for the items mentioned above. In addition, Comparative Example 2, Reference Example and Example have the basic pattern shown in FIG. 1, except for the configuration of the crown land portion described above, and have substantially the same configuration.

Comparative Example 2, Reference Example and Example were tested for the steering stability on a dry road and wet performance as described above. The common specifications of each test tire are described above.

Steering Stability on Dry Road Test:

As above, the steering stability on dry road was evaluated. The test results are indicated using a score with 100 for the steering stability of Comparative Example 2.

Wet Performance Test:

Wet performance was evaluated by the driver's sensory evaluation when the test vehicle was driven on wet roads. The test results are indicated using a score with the wet performance of Comparative Example 2 being 100, and the larger the number, the better the wet performance.

Table 2 shows the test results.

TABLE 2

|  | Comparative Example 2 | Reference Example | Example |
|---|---|---|---|
| Steering stability on dry road (score) | 100 | 103 | 100 |
| Wet performance (score) | 100 | 105 | 115 |

As a result of the test, it was confirmed that the Reference Example exhibited excellent wet performance while maintaining steering stability on a dry road. It was also confirmed that Example obtained a further improvement in performance compared to Reference Example.

[Additional Notes]

The present disclosure includes the following aspects.

Note 1

A tire comprising:
a tread portion comprising a first tread edge, a second tread edge, and a crown land portion arranged between the first tread edge and the second tread edge, wherein
the crown land portion comprises a first longitudinal edge extending in a tire circumferential direction on a first tread edge side, a second longitudinal edge extending in the tire circumferential direction on a second tread edge side, and a ground contact surface between the first longitudinal edge and the second longitudinal edge,
the crown land portion is provided with a plurality of first crown sipes, a plurality of second crown sipes, and a plurality of third crown sipes,
the first crown sipes, the second crown sipes, and the third crown sipes open at the ground contact surface via chamfer portions,
the first crown sipes and the third crown sipes extend from the first longitudinal edge and have closed ends in the ground contact surface,
the second crown sipes extend from the second longitudinal edge and have closed ends in the ground contact surface,
each of the first crown sipes has an opening width at the ground contact surface which is constant in a longitudinal direction of the sipe,
each of the second crown sipes has an opening width at the ground contact surface which is constant in a longitudinal direction of the sipe, and
each of the third crown sipes has an opening width which decreases continuously from the first longitudinal edge toward the closed end thereof.

Note 2

The tire according to note 1, wherein
the first crown sipes, the second crown sipes and the third crown sipes are inclined in a same direction with each other with respect to a tire axial direction.

Note 3

The tire according to note 1 or 2, wherein
the opening width of each of the second crown sipes ranges from 80% to 120% of the opening width of each of the first crown sipes.

Note 4

The tire according to any one of notes 1 to 3, wherein
a maximum opening width of each of the third crown sipes is smaller than the opening width of each of the first crown sipe.

Note 5

The tire according to any one of notes 1 to 4, wherein
a length in a tire axial direction of the third crown sipes is smaller than a length in the tire axial direction of the first crown sipes.

Note 6

The tire according to any one of notes 1 to 5, wherein
the closed ends of the third crown sipes are located on a second longitudinal edge side with respect to the closed ends of the second crown sipes.

Note 7

The tire according to any one of notes 1 to 6, wherein
the crown land portion is further provided with a plurality of fourth crown sipes extending from the second longitudinal edge and having closed ends in the ground contact surface,
the plurality of fourth crown sipes opens at the ground contact surface via chamfer portions, and
each of the fourth crown sipes has an opening width at the ground contact surface which decreases continuously from the second longitudinal edge toward the closed end thereof.

Note 8

The tire according to note 7, wherein
a maximum opening width of each of the fourth crown sipes is smaller than the opening width of each of the second crown sipes.

Note 9

The tire according to note 7 or 8, wherein
a length in a tire axial direction of the fourth crown sipes is smaller than a length in the tire axial direction of the second crown sipes.

Note 10

The tire according to any one of notes 1 to 9, wherein the tread portion has a designated mounting direction on a vehicle, and the first tread edge is located outside the vehicle when mounted on the vehicle.

Note 11

The tire according to any one of notes 1 to 10, wherein the first crown sipes have outer ends on a first longitudinal edge side,
the second crown sipes have outer ends on a second longitudinal edge side, and
a minimum distance in the tire circumferential direction between the outer ends of the first crown sipes and the outer ends of the second crown sipes is equal to or less than 10% of a circumferential arrangement pitch of the first crown sipes.

Note 12

The tire according to any one of notes 1 to 11, wherein the closed ends of the second crown sipes are located on a first longitudinal edge side with respect to the closed ends of the first crown sipes.

Note 13

The tire according to any one of notes 1 to 12, wherein a length in the tire axial direction of the second crown sipes is greater than a length in the tire axial direction of the first crown sipes.

Note 14

The tire according to any one of notes 1 to 13, wherein the crown land portion is further provided with a plurality of fourth crown sipes extending from the second longitudinal edge and having closed ends in the ground contact surface,
in a tread plan view, the fourth crown sipes have a shape different from the first crown sipes and the second crown sipes,
the third crown sipes have outer ends on a first longitudinal edge side,
the fourth crown sipes have outer ends on a second longitudinal edge side, and
a minimum distance in the tire circumferential direction between the outer ends of the third crown sipes and the outer ends of the fourth crown sipes is equal to or less than 10% of a circumferential arrangement pitch of the third crown sipes.

Note 15

The tire according to note 14, wherein
the third crown sipes and the fourth crown sipes are inclined with respect to a tire axial direction in a same direction as with the first crown sipes and the second crown sipes.

Note 16

The tire according to note 14 or 15, wherein
the closed ends of the third crown sipes are located on a first longitudinal edge side with respect to the closed ends of the fourth crown sipes.

Note 17

The tire according to any one of notes 1 to 16, wherein a length in a tire axial direction of the first crown sipes ranges from 40% to 60% of a width in the tire axial direction of the ground contact surface of the crown land portion.

Note 18

The tire according to any one of notes 1 to 17, wherein a length in the tire axial direction of the second crown sipes ranges from 65% to 85% of a width in the tire axial direction of the ground contact surface of the crown land portion.

Note 19

The tire according to any one of notes 1 to 18, wherein a length in the tire axial direction of the third crown sipes ranges from 25% to 45% of a width in the tire axial direction of the ground contact surface of the crown land portion.

Note 20

The tire according to any one of notes 1 to 19, wherein angles of the first crown sipes, the second crown sipes and the third crown sipes range from 25 to 35 degrees with respect to a tire axial direction.

The invention claimed is:
1. A tire comprising:
a tread portion comprising a first tread edge, a second tread edge, and a crown land portion arranged between the first tread edge and the second tread edge, wherein
the crown land portion comprises a first longitudinal edge extending in a tire circumferential direction on a first tread edge side, a second longitudinal edge extending in the tire circumferential direction on a second tread edge side, and a ground contact surface between the first longitudinal edge and the second longitudinal edge,
the crown land portion is provided with a plurality of first crown sipes, a plurality of second crown sipes, and a plurality of third crown sipes,
the first crown sipes, the second crown sipes, and the third crown sipes open at the ground contact surface via chamfer portions,
the first crown sipes, the second crown sipes, and the third crown sipes each include a main body portion having two opposing inner walls with a width of 1.5 mm or less,
the first crown sipes and the third crown sipes extend from the first longitudinal edge and have closed ends in the ground contact surface,
the closed ends of the third sipes are not connected to any other groove or sipe,
the second crown sipes extend from the second longitudinal edge and have closed ends in the ground contact surface, each of the first crown sipes has an opening width at the ground contact surface which is constant in a longitudinal direction of the sipe, each of the second crown sipes has an opening width at the ground contact surface which is constant in a longitudinal direction of the sipe, and each of the third crown sipes has an opening width which decreases continuously from the first longitudinal edge toward the closed end thereof.

2. The tire according to claim 1, wherein the first crown sipes, the second crown sipes and the third crown sipes are inclined in a same direction with each other with respect to a tire axial direction.

3. The tire according to claim 1, wherein the opening width of each of the second crown sipes ranges from 80% to 120% of the opening width of each of the first crown sipes.

4. The tire according to claim 1, wherein a maximum opening width of each of the third crown sipes is smaller than the opening width of each of the first crown sipes.

5. The tire according to claim 1, wherein a length in a tire axial direction of the third crown sipes is smaller than a length in the tire axial direction of the first crown sipes.

6. The tire according to claim 1, wherein the closed ends of the third crown sipes are located on a second longitudinal edge side with respect to the closed ends of the second crown sipes.

7. The tire according to claim 1, wherein the crown land portion is further provided with a plurality of fourth crown sipes extending from the second longitudinal edge and having closed ends in the ground contact surface, the plurality of fourth crown sipes opens at the ground contact surface via chamfer portions, and each of the fourth crown sipes has an opening width at the ground contact surface which decreases continuously from the second longitudinal edge toward the closed end thereof.

8. The tire according to claim 7, wherein a maximum opening width of each of the fourth crown sipes is smaller than the opening width of each of the second crown sipes.

9. The tire according to claim 7, wherein a length in a tire axial direction of the fourth crown sipes is smaller than a length in the tire axial direction of the second crown sipes.

10. The tire according to claim 1, wherein the first crown sipes have outer ends on a first longitudinal edge side, the second crown sipes have outer ends on a second longitudinal edge side, and a minimum distance in the tire circumferential direction between the outer ends of the first crown sipes and the outer ends of the second crown sipes is equal to or less than 10% of a circumferential arrangement pitch of the first crown sipes.

11. The tire according to claim 1, wherein the closed ends of the second crown sipes are located on a first longitudinal edge side with respect to the closed ends of the first crown sipes.

12. The tire according to claim 1, wherein a length in a tire axial direction of the second crown sipes is greater than a length in the tire axial direction of the first crown sipes.

13. The tire according to claim 1, wherein the crown land portion is further provided with a plurality of fourth crown sipes extending from the second longitudinal edge and having closed ends in the ground contact surface, in a tread plan view, the fourth crown sipes have a shape different from the first crown sipes and the second crown sipes, the third crown sipes have outer ends on a first longitudinal edge side, the fourth crown sipes have outer ends on a second longitudinal edge side, and a minimum distance in the tire circumferential direction between the outer ends of the third crown sipes and the outer ends of the fourth crown sipes is equal to or less than 10% of a circumferential arrangement pitch of the third crown sipes.

14. The tire according to claim 13, wherein the third crown sipes and the fourth crown sipes are inclined with respect to a tire axial direction in a same direction as with the first crown sipes and the second crown sipes.

15. The tire according to claim 13, wherein the closed ends of the third crown sipes are located on a first longitudinal edge side with respect to the closed ends of the fourth crown sipes.

16. The tire according to claim 1, wherein a length in a tire axial direction of the first crown sipes ranges from 40% to 60% of a width in the tire axial direction of the ground contact surface of the crown land portion.

17. The tire according to claim 1, wherein a length in a tire axial direction of the second crown sipes ranges from 65% to 85% of a width in the tire axial direction of the ground contact surface of the crown land portion.

18. The tire according to claim 1, wherein angles of the first crown sipes, the second crown sipes and the third crown sipes range from 25 to 35 degrees with respect to a tire axial direction.

19. The tire according to claim 1, wherein the closed ends of the first sipes are not connected to any other groove or sipe.

20. The tire according to claim 1, wherein the closed ends of the second sipes are not connected to any other groove or sipe.

* * * * *